US008353041B2

(12) United States Patent
Brown et al.

(10) Patent No.: US 8,353,041 B2
(45) Date of Patent: Jan. 8, 2013

(54) SECURE APPLICATION STREAMING (75) Inventors: Timothy Brown, Cupertino, CA (US); Robert Clyde, Cupertino, CA (US)

(73) Assignee: Symantec Corporation, Cupertino, CA (US)

( * ) Notice: Subject to any disclaimer, the term of this patent is extended or adjusted under 35 U.S.C. 154(b) by 914 days.

(21) Appl. No.: 12/122,575

(22) Filed: May 16, 2008

(65) Prior Publication Data

US 2009/0288166 A1 Nov. 19, 2009

(51) Int. Cl.
*G06F 21/00* (2006.01)

(52) U.S. Cl. ............... 726/24; 726/22; 726/23; 713/153; 713/156; 713/188; 709/224

(58) Field of Classification Search ............... 726/22–24; 713/153, 156, 188
See application file for complete search history.

(56) References Cited

U.S. PATENT DOCUMENTS

| 5,832,208 | A  | * | 11/1998 | Chen et al. ........................ 726/24 |
| 5,892,904 | A  | * | 4/1999 | Atkinson et al. ................. 726/22 |
| 6,088,803 | A  | * | 7/2000 | Tso et al. ......................... 726/22 |
| 6,611,925 | B1 | * | 8/2003 | Spear .......................... 714/38.14 |
| 7,107,618 | B1 |   | 9/2006 | Gordon et al. |
| 7,363,498 | B2 | * | 4/2008 | Hennessey et al. ........... 713/176 |
| 7,483,993 | B2 | * | 1/2009 | Nachenberg et al. ......... 709/229 |
| 2002/0016925 | A1 | * | 2/2002 | Pennec et al. ................. 713/201 |
| 2002/0016959 | A1 | * | 2/2002 | Barton et al. ................. 717/178 |
| 2002/0138766 | A1 | * | 9/2002 | Franczek et al. ............. 713/201 |
| 2003/0126303 | A1 | * | 7/2003 | Kadakia et al. ............... 709/313 |
| 2006/0101282 | A1 | * | 5/2006 | Costea et al. ................. 713/188 |
| 2006/0123244 | A1 | * | 6/2006 | Gheorghescu et al. ....... 713/188 |
| 2006/0259968 | A1 | * | 11/2006 | Nakakoji et al. ................. 726/22 |
| 2007/0083930 | A1 | * | 4/2007 | Dumont et al. ................. 726/24 |
| 2007/0240220 | A1 | * | 10/2007 | Tuvell et al. .................... 726/24 |

OTHER PUBLICATIONS

Paul Royal, Mitch Halpin, David Dagon, Robert Edmonds, Wenke Lee, "PolyUnpack: Automating the Hidden-Code Extraction of Unpack-Executing Malware",Georgia Institute of Technology, USA, 2006.*
Hitchen, D., "Softgrid FAQ, SoftGrid Applications: Can a SoftGrid Application be Infected by a Virus or Malware?" Technet Blogs, Sep. 2007, 8 pages, [Online] [Retrieved on Sep. 1, 2009] Retrieved from the Internet<URL:http://blogs.technet.com/dhitchen/default.aspx.
PCT International Search Report and Written Opinion, PCT Application No. PCT/US2009/044017, Sep. 14, 2009, 11 pages.
"Softricity Softgrid v4: Under the Covers Exploring the Softgrid Platform," Softricity Publications, Oct. 2006, 31 pages, [Online] [Retrieved on Sep. 1, 2009] Retrieved from the Internet<URL:http://www.citrixtraininguk.co.uk/Documenets/Softgrid_under_the_covers.pdf>.

* cited by examiner

*Primary Examiner* — Taghi Arani
*Assistant Examiner* — Amir Mehrmanesh
(74) *Attorney, Agent, or Firm* — Fenwick & West LLP (57) ABSTRACT

A server includes a scanning module for determining whether an application is free of malware, a module for packaging the application into blocks for delivery via application streaming, a module for providing the blocks to a client on request, and a module for adding to each block an indication of whether the associated application has already been determined to be free of malware. A client includes a module for requesting blocks of a streamed application from the server. When the client receives a block, it employs a module for verifying that the associated applications have been determined to be free of malware by examining the indication provided by the server. If verification is successful, then the block's code is executed without first receiving and scanning any additional blocks from the server.

18 Claims, 6 Drawing Sheets

FIG. 6 ness of the clear ability of application streaming, without requiring that the software halts the execution of the streamed application until the entire application has been downloaded, scans the application as a whole, and only then permits the application to execute. This eliminates the beneficial ability of application streaming to execute an application of which only a portion is actually present on the client machine.

SECURE APPLICATION STREAMING

BACKGROUND OF THE INVENTION

1. Field of the Invention

This invention pertains in general to computer security and in particular to efficiently implementing security checks of streamed applications.

2. Description of the Related Art

Application streaming is emerging as a useful way to execute applications and has benefits not provided by traditional application execution approaches. Specifically, application streaming permits execution of an application that has not been installed or stored locally on the client system on which it executes, providing application code and data to the client as needed, one block at a time. This provides a number of benefits, such as saving disk space that would otherwise be required on the client machine for storing the entire application, allowing centralized licensing control and simplified ability to patch and update applications, and allowing execution of the application to begin without requiring all the code to be first downloaded.

However, application streaming currently does not always integrate smoothly with existing systems. In particular, the use of security systems such as malware scanning software currently can negate the benefits of application streaming. Specifically, conventional malware scanning technology sometimes cannot detect the presence of malware based on a single block of the application, taken separately from the rest of the application. Thus, conventional malware scanning software halts the execution of the streamed application until the entire application has been downloaded, scans the application as a whole, and only then permits the application to execute. This eliminates the beneficial ability of application streaming to execute an application of which only a portion is actually present on the client machine.

BRIEF SUMMARY

The difficulties described above are addressed by a method, computer, and computer program product that incorporate a trust-based mechanism to ensure that all portions of a streamed application are free of malware while still preserving the beneficial performance properties of application streaming.

One embodiment of the method receives a streamed block of an application, the block comprising code for a unit of an application. The method determines whether the block contains an indication that the application has been found to be free of malware, and responsive at least in part to the block containing an indication that the application has been found to be free of malware, execution of the code is permitted.

A computer adapted to incorporate malware scanning within an application streaming system, comprises a computer-readable storage medium storing executable computer program modules. The computer program modules comprise a block server module for receiving, from a client, a request for a block, the block comprising code for a unit of an application. The modules further comprise a scan assurance module for determining whether the application has been found to be free of malware. The block server module obtains the requested block; the scan assurance module inserts into the obtained block an indication that the application has been scanned, responsive to determining that the application has been found to be free of malware; and the block server module provides the block, including the inserted indication, to the client.

Embodiments of the computer program product have a computer-readable storage medium storing executable computer program modules for incorporating malware scanning within an application streaming system, the modules comprising a client application streaming module for receiving a streamed block of an application from a server, the block comprising code for a unit of the application. The modules further comprise client scan verification module for determining whether the block contains an indication that the application has been found to be free of malware, and for permitting execution of the code responsive at least in part to the block containing an indication that the application has been found to be free of malware.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
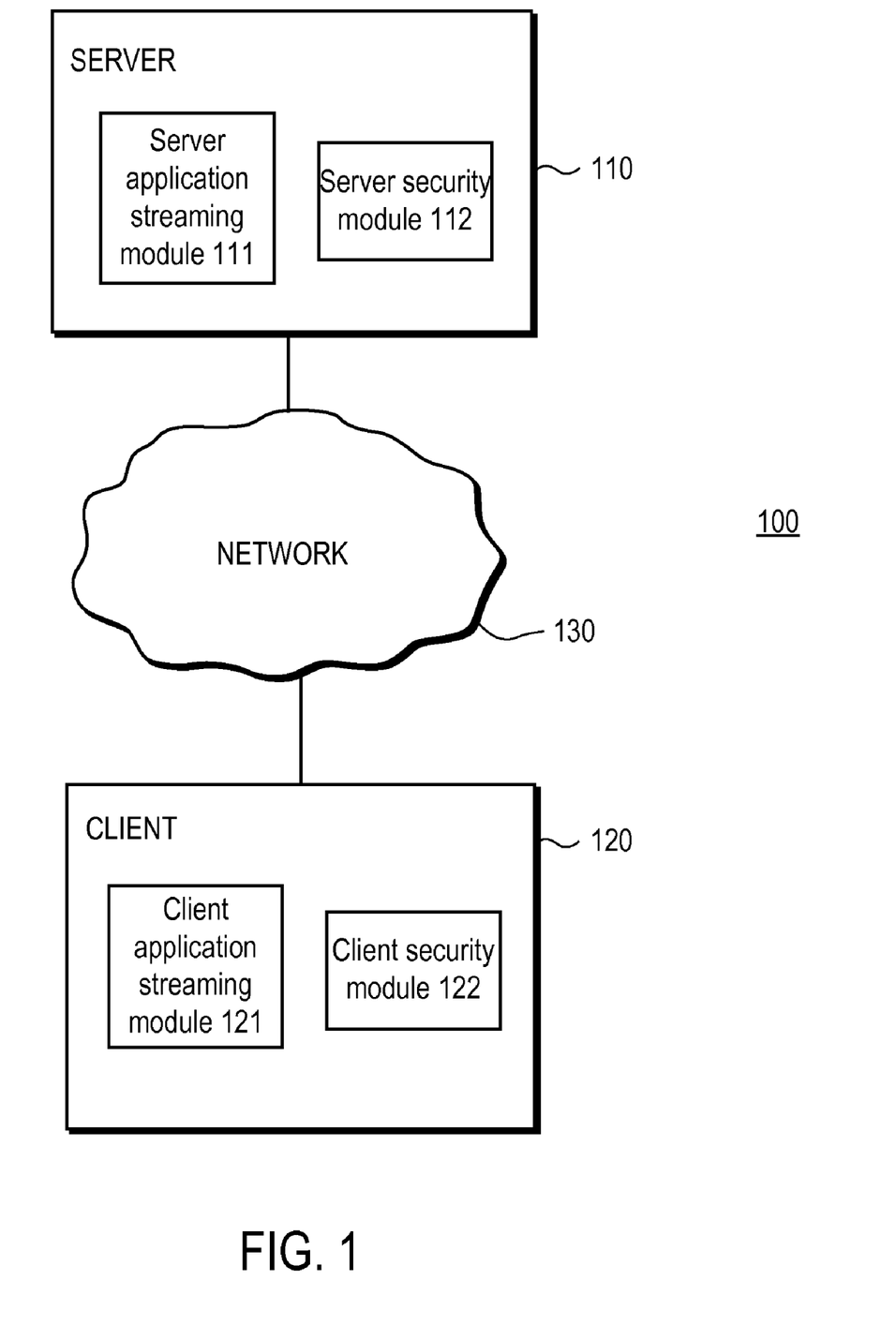
FIG. 1 is a high-level block diagram of a computing environment according to one embodiment.

FIG. 1 is a high-level block diagram of a computing environment 100 according to one embodiment. FIG. 1 illustrates a server 110 and a client 120 connected by a network 130. Only one client 120 and one server 110 are shown in FIG. 1 in order to simplify and clarify the description. Embodiments of the computing environment 100 can have thousands or millions of clients 120 and servers 110 connected to the network 130.

The client 120 can execute a variety of software applications, either according to the traditional paradigm in which the applications are installed locally prior to being executed, or using an application streaming system, in which an application is stored remotely on the server 110 and downloaded in separate pieces ("blocks") and executed locally on the client 120.

In order to support application streaming, the server 110 stores the application code and data (collectively termed "the application" hereinafter) and makes them available for access. The server 110 comprises a server application streaming module 111 for providing a streamed application to requesting clients, and a server security module 112 for incorporating security into the application streaming provided by the server application streaming module 111. The client 120 in turn comprises a client application streaming module 121 for requesting blocks of a desired application via application streaming, receiving the blocks, and executing code from the blocks in order to run the application. The client 120 additionally comprises a client security module 122 that incorporates security features into the application streaming provided by the client application streaming module 121. These client and server application streaming modules 111 and 121, together referred to as the "application streaming system," communicate with each other to provide the client 120 with the application blocks needed to carry out the currently-required application functionality. Further, the client and server security modules 112 and 122 interact with their respective application streaming modules 111 and 121 in order to provide security for application streaming without requiring the entire application to be downloaded prior to its execution, thereby providing application execution with minimal delay.

The server 110 communicates with the client 120 via the network 130. In one embodiment, the network 130 is the Internet. The network 130 can also utilize dedicated or private communications links that are not necessarily part of the Internet. In one embodiment, the network 130 uses standard communications technologies and/or protocols such as Ethernet, 802.11, etc. Similarly, the networking protocols used on the network 130 can include the transmission control protocol/Internet protocol (TCP/IP), the hypertext transport protocol (HTTP), the file transfer protocol (FTP), etc. The data exchanged over the network 130 can be represented using technologies and/or formats including the hypertext markup language (HTML), the extensible markup language (XML), etc., as well as custom data streaming formats designed specifically for the transfer of application blocks. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
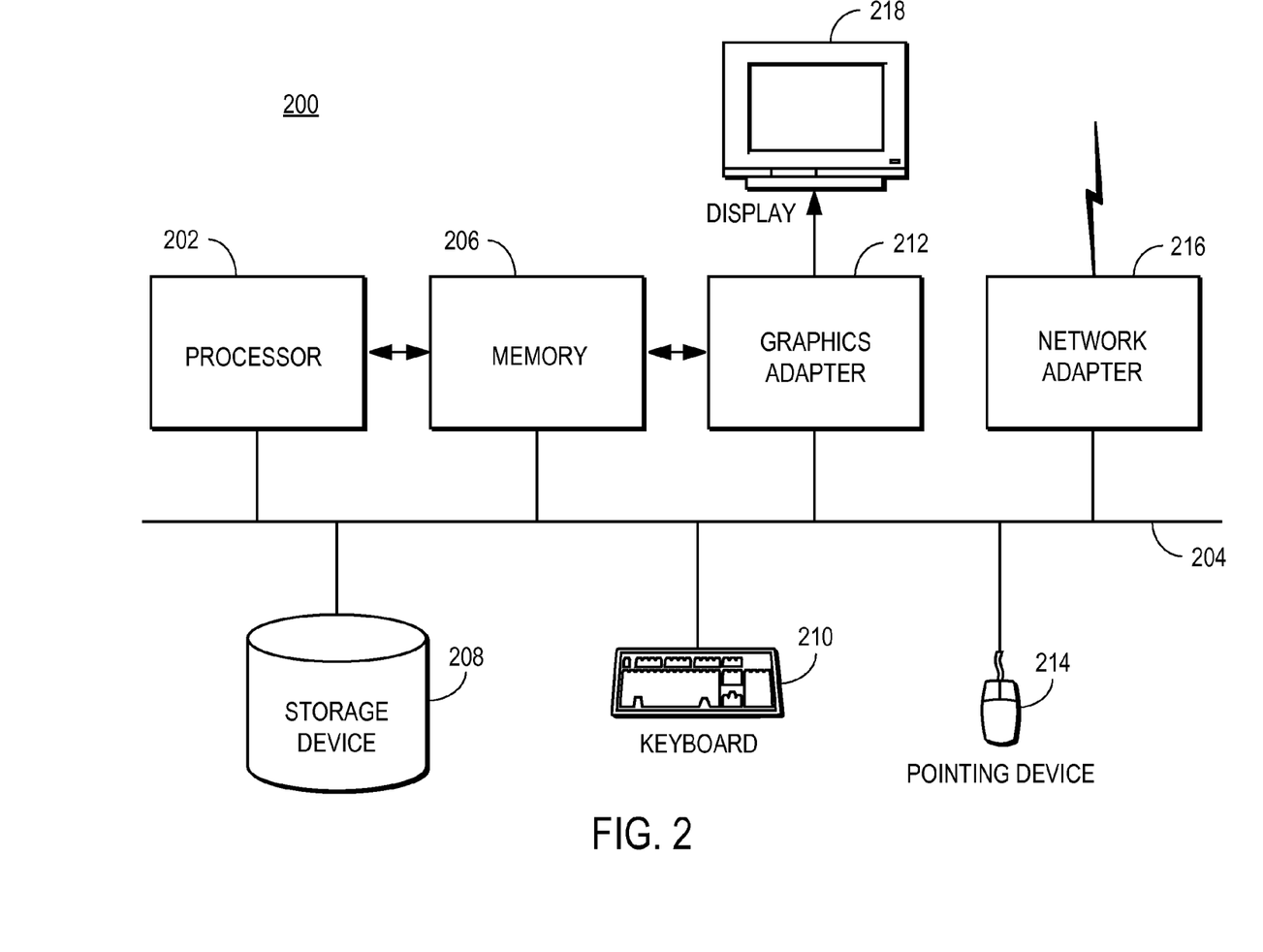
FIG. 2 is a high-level block diagram illustrating a typical computer for use as a client or server according to one embodiment.

FIG. 2 is a high-level block diagram illustrating a typical computer 200 for use as a client 120 or server 110 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 130. The storage device 208 is, in one embodiment, a hard disk drive but can also be any other device capable of storing data, such as a writeable compact disk (CD) or DVD, a solid-state memory device, or other form of computer-readable storage medium. The storage device 208 stores the files for the operating system, applications, etc.

The types of computers 200 utilized by the entities of FIG. 1 can vary depending upon the embodiment and the processing power utilized by the entity. For example, a client 120 that is a personal digital assistant (PDA) typically has limited processing power, a small display 218, and might lack a pointing device 214. The server 110, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200, including both the code and the data that the program comprises. The application is formed of one or more files that typically reside on the storage device 208 and are loaded into memory 206 when executed. At least one of the files loaded into memory 206 is referred to as the "executable image" and is executed as a process when executed in a traditional manner. When executed via application streaming, however, the application is segmented and executed in a different manner, as described more fully below.

Figure 3:
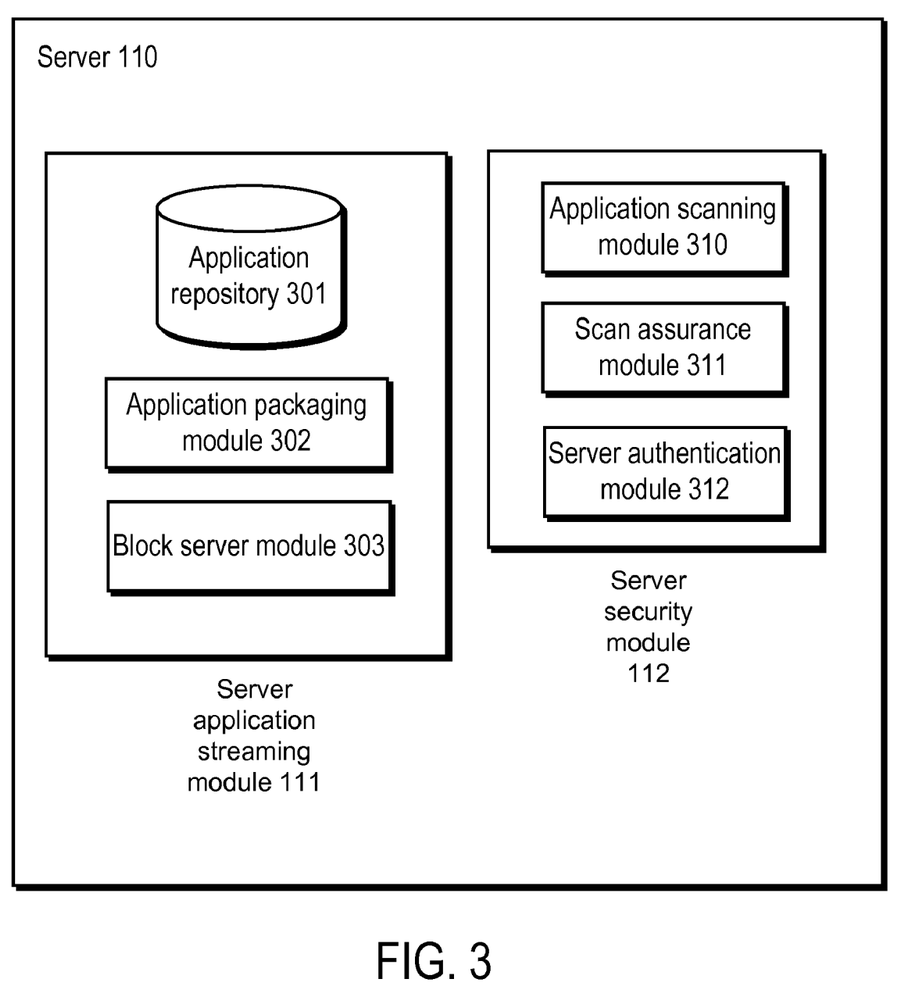
FIG. 3 is a high-level block diagram illustrating a detailed view of modules within the server, according to one embodiment.

FIG. 3 is a high-level block diagram illustrating a detailed view of modules within the server 110 according to one embodiment, including the server application streaming module 111 and the server security module 112. The sub-modules of the server application streaming module 111 of together provide the ability to stream an application to a client 120, and include an application repository 301, an application packaging module 302, and a block server module 303.

The application packaging module 302 divides an application into a set of segments, termed "blocks." In one embodiment, each block represents a particular logical unit of the application. A block may contain, in addition to a portion of the program itself, any metadata about the block useful to the application streaming system, such as its block number, its size in bytes, the byte range of the application that the block represents, etc. The application packaging module 302 additionally creates any organizational information required by the application streaming system to allow the client 120 to obtain the needed blocks. For example, in one embodiment the application packaging module 302 creates a data structure, e.g. a list, that correlates block numbers with the application byte ranges that they represent. This enables a client to determine which block number it requires in order to execute an instruction stored at a given memory address. The division into blocks may be logical or physical—that is, the application may be physically divided into discrete blocks that are stored separately, or the blocks may be stored together and logically separated by means of the aforementioned data structure that correlates an address with a block number.

The application repository 301 stores the segmented applications and any corresponding organizational information, as created by the application packaging module 302. The application repository 301 may be implemented in different manners in different embodiments. For example, in one embodiment the application repository 301 is a set of tables in a relational database management system.

The block server module 303 provides the appropriate blocks to the client 120 in response to a request for a streamed application or particular blocks thereof. The particular manner in which it does so depends upon the way in which the application packaging module 302 packaged the application. For example, in an embodiment in which the application packaging module 302 does not physically segment the application, the block server module 303 provides a requested block by sending the particular byte range of the file corresponding to the requested block number, dynamically inserting any required metadata, such as the block number. Alternatively, in an embodiment in which the blocks are stored separately along with their corresponding metadata, the block server module merely sends a copy of that discrete block of data.

It is appreciated that the server application streaming module 111 and the modules thereof may be implemented in a variety of different manners, and is not limited to the particular implementation described above. Rather, many alternate implementations would be known to one of ordinary skill in the art, such as implementations having different numbers of modules or relationships therebetween, different data formats for packaging an application for application streaming, and the like.

The sub-modules of the server security module 112 include an application scanning module 310 and a scan assurance module 311, which cooperate with the modules of the server application streaming module 111 to provide assurance to the client 120 that the streamed application does not contain malware. In one embodiment, the server security module 112 additionally includes a server authentication module 312 used as part of authentication of the server 110 to the client 120. The application scanning module 310 scans an application to ensure that it is free of malware. In one embodiment, prior to being scanned by the application scanning module 310, the applications are installed and stored in a conventional manner within the file system of the server 110. In other embodiments, the applications can be stored within a portion of the application repository 301 that is separate from the packaged form of the applications. In one embodiment, the scan is performed on an application before it is packaged for delivery as a streamed application. The application scanning module 310 can be implemented using conventional malware-detection software such as NORTON ANTIVIRUS, available from Symantec Corporation.

The scan assurance module 311 interacts with the block server module 303 to indicate that the blocks provided to the client have been scanned. Specifically, the scan assurance module 311 adds, to each block sent to the client 120, an indication of whether a malware scan has been performed on the application to which the block corresponds. In one embodiment, only applications that have previously been scanned are packaged for delivery as streamed applications, and thus in such an embodiment the indication added by the scan assurance module 311 is always positive, indicating that the block has been scanned. In another embodiment in which applications may be packaged and made available for streaming without having been scanned, the scan assurance module 311 has access to a data structure that correlates applications with whether they have been scanned and determined to be free of malware. Such a data structure could be maintained by the application scanning module 310, for example.

The server authentication module 312 applies cryptographic techniques to assure a client 120 that the indication in a block provided by the scan assurance module 311 is trustworthy. For example, in one embodiment the server authentication module 312 encrypts a communications channel between the server 110 and the client 120 to ensure that the indication is not altered during transmission by a malicious intermediary; thus, the server 110 encrypts the block before transmitting it to the client, and the client 120 decrypts the block before examining it. In another embodiment, the server authentication module 312 digitally signs the block to allow the client 120 to verify that the block has not been altered.

Figure 4:
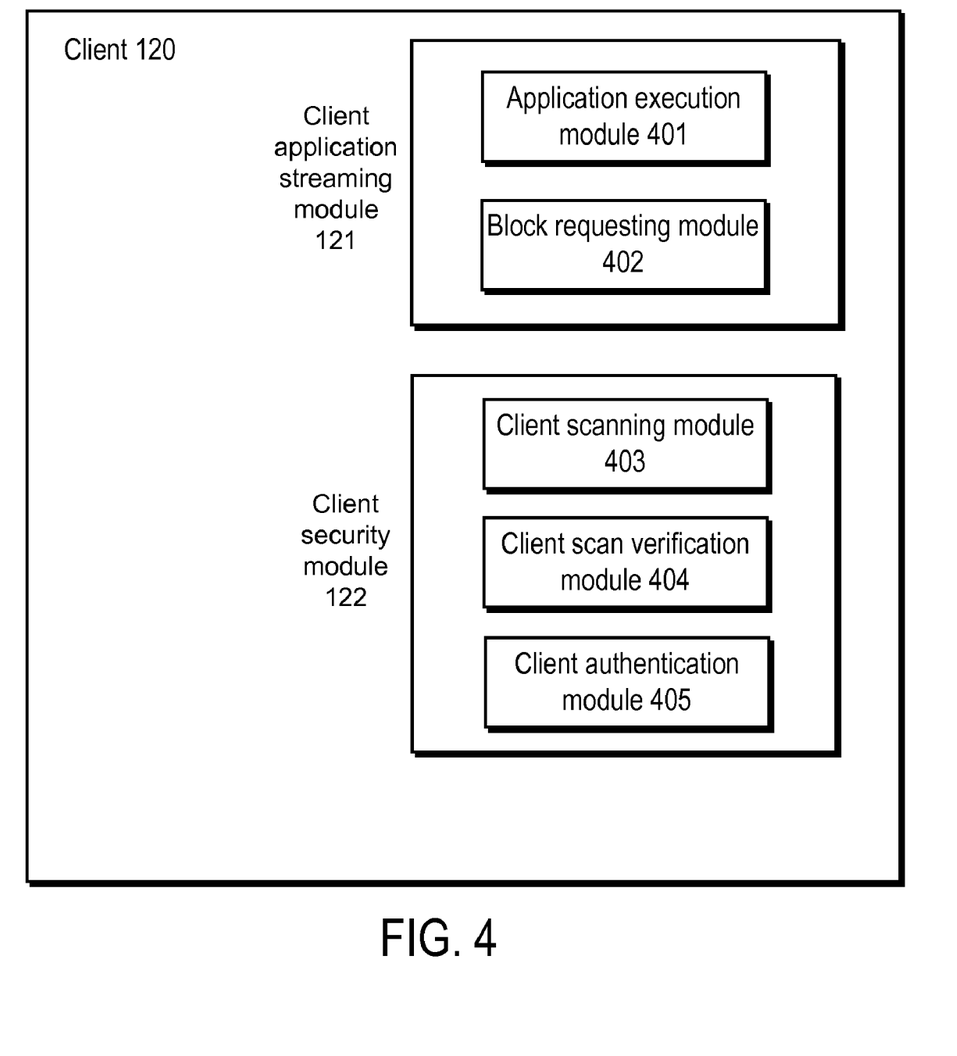
FIG. 4 is a high-level block diagram illustrating a detailed view of modules within the client, according to one embodiment.

FIG. 4 is a high-level block diagram illustrating a detailed view of modules within the client 120 according to one embodiment. The client application streaming module 121 is the client-side component of the application streaming system and communicates with the server application streaming module 111. The client application streaming module 121 includes an application execution module 401 and a block requesting module 402. The application execution module 401 receives and executes blocks from the server 110. In one embodiment, the application execution module 401 stores the received blocks locally within a temporary storage area, such as a memory buffer, that will be available to the application execution module 401 when executing instructions. Application streaming can be initiated, for example, by providing the client application streaming module 121 with the identifier of a streamed application the execution of which is desired. For example, a user might double-click on a desktop icon illustrating the streamed application. Such an icon would specify execution of a process implementing the client application streaming module 121, with the identifier of the streamed application passed to the process as an argument.

The block requesting module 402 sends requests to the server 110 for blocks necessary for executing the streamed application. In one embodiment, the block requesting module 402 has access to a data structure, such as that created in one embodiment by application packaging module 302, that correlates instruction addresses with blocks. Thus, when an instruction to be executed corresponds to a block not already downloaded by the client application streaming module 121, the block requesting module sends a request for that block to the server 110; when the instruction to be executed corresponds to a block that has been downloaded, no such request is necessary, since the instruction is already available locally on the client 120, such as within a memory buffer of the application execution module 401.

The client security module 122 determines whether the streamed application is free of malicious code. The client scanning module 403 scans the client system for the presence of malware. In one embodiment, the client scanning module 403 is implemented by existing anti-malware software, such as NORTON ANTIVIRUS, and has automatic protection features that automatically detect and scan incoming data.

The client scan verification module 404 interfaces with the client scanning module 403 to examine a block of a streaming application received at the client 120 to determine whether the streamed application has already been scanned and found to be free of malware. The client scan verification module 404 looks for the indication at a location in the block where the scan assurance module 311 is designed to place it. For example, the indication could be placed in the first byte of a block, with a non-zero value indicating that the relevant application has previously been scanned, and a zero value indicating that it has not. If such an indication is found, the client scan verification module 404 need not pass a block to the client scanning module 403, but rather can immediately pass the block to the application execution module 401 for storage and execution; if it is not found, however, then the client scan verification module 404 will pass the block to the client scanning module 403, which will then halt execution of the streamed application until all the application's blocks have been downloaded and the entire application file has been scanned.

A client authentication module 405 ensures that the server 110 providing the streamed application is indeed a reliable, trusted source. If the client authentication module 405 does not determine that the server 110 is a trusted source, then an indication that the block has been found to be free of malware is ignored, the block instead being considered not to contain such an indication. Thus, in one embodiment, the block will be passed to the client scanning module 403, with the result that all application blocks will be downloaded and the application scanned as a whole before it can be executed.

In one embodiment, the client authentication module 405 maintains a whitelist of servers specifically authorized to perform application streaming, considering a server on the whitelist to be sufficiently authenticated. More specifically, the whitelist includes a list of unique server identifiers, such as internet protocol (IP) addresses. This list may be entered by the user, or by the author of the software embodying the client authentication module 405, or be a combination thereof. Then, when a particular server 110 is streaming applications to the client 120, the client authentication module 405 determines whether the IP address of the server 110 is within its whitelist, authenticating the server if so, and not authenticating it otherwise. Such a whitelist-based method of authentication is merely one example, and other methods of authentication would be equally possible to one of ordinary skill in the art.

Additionally, the client authentication module 405 ensures that malware is not inserted into a block at some point between the sending by the server 110 and the receipt by the client 120. This may be accomplished by the client authentication module 405 of the client 120 using conventional cryptographic techniques in cooperation with the server authentication module 312 on the server 110, as discussed above with respect to the server authentication module 312.

Figure 5:
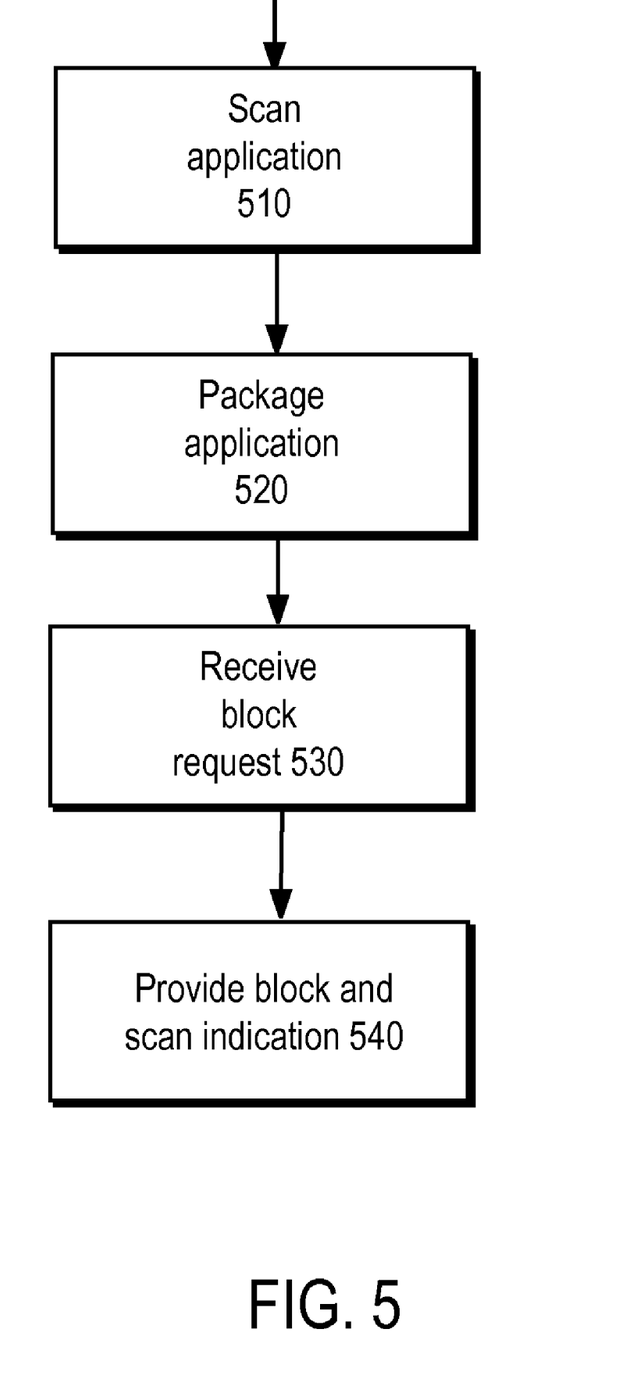
FIG. 5 is a flowchart illustrating steps performed by a server application streaming module in cooperation with a server security module, according to one embodiment.

FIG. 5 is a flowchart illustrating steps performed by the server application streaming module 111 in cooperation with the server security module 112, according to one embodiment. In one embodiment, the application scanning module 310 first scans 510 an application to ensure that it does not contain malware. Subsequently, the application packaging module 302 packages 520 the application, segmenting it into blocks and creating any other necessary associated information, as described above. The packaged application is stored within the application repository 301, where it becomes available for streaming to clients. Next, the block server module 303 receives 530 a request for a block from the client 120. The block server module 303 then provides the requested block to the scan assurance module 311, which augments the block by adding, at a given location of the block, an indication of whether the application to which the block corresponds has been scanned for malware and found to be malware-free. Finally, the scan assurance module provides 540 the augmented block to the client 120.

Figure 6:
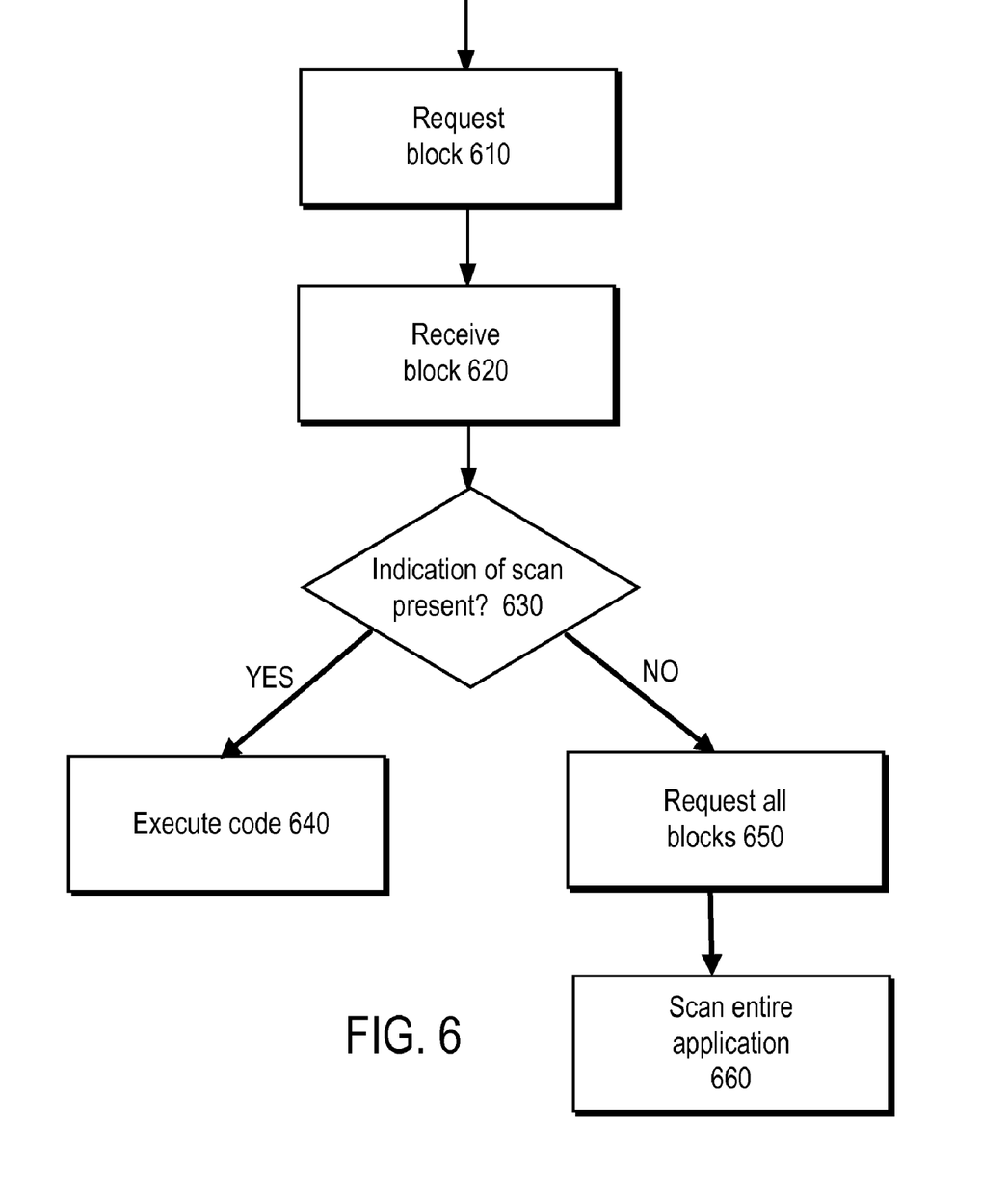
FIG. 6 is a flowchart illustrating steps performed by a client application streaming module in cooperation with a client security module, according to one embodiment.

FIG. 6 is a flowchart illustrating steps performed by the client application streaming module 121 in cooperation with the client security module 122, according to one embodiment. First, the block requesting module 402 of the client 120 requests 610 a block. The block request may be for a single block, or for multiple blocks, depending on the situation. For example, when the application to be streamed is first executed, the block requesting module 402 may request multiple blocks in order to obtain, in one transaction, all the code needed for the initial or core functionality of the application. Later, individual blocks may be requested by block requesting module 402 when accessing code for which a block has not already been obtained. Subsequently, the client 120 receives the requested block or blocks from the server 110. The client scan verification module 404 examines the block to determine whether there is an indication 630 that that application has previously been scanned for malware.

If the block does contain such an indication, then the client scan verification module 404 prevents the client scanning module 403 from operating on the block, instead allowing the application execution module 401 to immediately execute 640 the relevant code within the block. If the block does not contain the indication, however, then the client scan verification module 404 passes the block to the client scanning module 403. As a result, the client scanning module 403 causes the block requesting module 402 to request 650 all the remaining blocks in the application. Then, when all the blocks have been received, the client scanning module 403 can assemble the blocks into a single unit and thereby scan 660 the entire application as a whole. In one embodiment, the client scan verification module 404 also passes the block to the client scanning module 403 even if the block does contain an indication that it was scanned, in response to the client authentication module 405 failing to determine that the server 110 providing the indication is trusted. In another embodiment, if the block does not contain the indication, or if the client authentication module 405 fails to determine that the server 110 is trusted, the client security module 122 issues an alert noting that the associated application has not been verified to be free of malware and prompting a user for input regarding whether to execute the application without performing a scan, taking the action specified by the user input, such as performing a scan, or executing the code without a scan. In another embodiment, the action to take in such cases is specified by a policy, such as a preference setting in security software embodying the client security module 122.

It is appreciated that the steps of FIGS. 5 and 6 are for purposes of example. In other embodiments, the steps could be performed in a different order, or a number of times rather than exactly once, or there could be additional, fewer, or alternate steps.

Thus, the above-described invention allows the integration of security into an application streaming system while simultaneously preserving the beneficial performance characteristics of application streaming.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of incorporating malware scanning within an application streaming system, comprising:
   receiving a user selection of an application via a graphical user interface;
   identifying accesses to code of the application responsive to the user selection of the application;
   identifying blocks of code of the application corresponding to the code accesses, each block comprising code for a unit of the application;
   responsive to not having received the identified blocks of code, requesting, from a remote application streaming server, the identified blocks of code;
   receiving a set of streamed blocks of the application from the remote application streaming server, each block comprising code for a unit of the application and having metadata comprising an indication of a portion of the application that the block represents, and each of a plurality of the streamed blocks containing an indication of whether the application has been found to be free of malware, the indication of whether the application has been found to be free of malware requiring at most one byte placed at a known location in the block and including either a first code indicating that the application has been found to be free of malware or a second code indicating that the application has not been found to be free of malware;

for each streamed block of the plurality of the streamed blocks:
  determining whether the indication contained in the streamed block indicates that the application has been found to be free of malware; and
  permitting execution of the code comprised by the streamed block, responsive at least in part to the streamed block containing an indication that the application has been found to be free of malware.

2. The method of claim 1, further comprising:
responsive at least in part to the indication of at least one of the plurality of blocks indicating that the application has not been found to be free of malware:
  halting execution of the code comprised by the received blocks;
  scanning the code to determine whether it contains malware; and
  permitting execution of the code, responsive to the scanning determining that the code does not contain malware.

3. The method of claim 2, further comprising receiving all blocks of the application, wherein scanning the code does not take place until all blocks of the application have been received.

4. The method of claim 1, further comprising:
responsive to the indication of at least one of the plurality of blocks indicating that the application has not been found to be free of malware:
  displaying an alert to a user that the application has not been verified to be free of malware;
  receiving user input specifying whether to execute the code without performing a scan of the block for malware; and
  responsive at least in part to the user input, executing the code without performing a scan of the block for malware.

5. The method of claim 1, further comprising:
authenticating the remote application streaming server by determining whether the server is on a security whitelist; and
permitting execution of the code responsive at least in part to the determination.

6. The method of claim 1, wherein at least one of the received blocks is digitally signed with a signature by the remote application streaming server, and receiving the block from the remote application streaming server further comprises verifying the signature.

7. The method of claim 1, wherein at least one of the received blocks is encrypted by the remote application streaming server, and receiving the block from the server remote application streaming further comprises decrypting the block.

8. The computer-implemented method of claim 1, wherein the indication of a portion of the application that the block represents comprises a block number.

9. The computer-implemented method of claim 1, wherein the indication of a portion of the application that the block represents an indication of a byte range of the application that the block represents.

10. A computer program product having a non-transitory computer-readable storage medium storing computer program modules executable by a computer processor and for incorporating malware scanning within an application streaming system, the modules comprising:
  a module that when executed by the processor receives a user selection of an application via a graphical user interface;
  a block requesting module that when executed by the processor performs actions comprising:
    identifying accesses to code of the application responsive to the user selection of the application;
    identifying blocks of code of the application corresponding to the code accesses, each block comprising code for a unit of the application;
    responsive to not having received the identified blocks of code, requesting the identified blocks of code from a remote application streaming server;
  a client application streaming module that when executed by the processor receives a set of streamed blocks of the application from the remote application streaming server, each streamed block comprising code for a unit of the application and having metadata comprising an indication of a portion of the application that the block represents, and each of a plurality of the streamed blocks containing an indication of whether the application has been found to be free of malware, the indication of whether the application has been found to be free of malware requiring at most one byte placed at a known location in the block and including either a first code indicating that the application has been found to be free of malware or a second code indicating that the application has not been found to be free of malware; and
  a client scan verification module that when executed by the processor:
    for each streamed block of the plurality of the streamed blocks:
      determines whether the indication contained in the streamed block indicates that the application has been found to be free of malware, and
      permits execution of the code comprised by the streamed block, responsive at least in part to the streamed block containing an indication that the application has been found to be free of malware.

11. The computer program product of claim 10, further comprising:
  a client scanning module that when executed by the processor performs actions comprising the following, responsive at least in part to the indication of at least one of the plurality of blocks indicating that the application has not been found to be free of malware:
    halting execution of the code comprised by the received blocks;
    scanning the code to determine whether it contains malware; and
    permitting execution of the code, responsive to the scanning determining that the code does not contain malware.

12. The computer program product of claim 10, further comprising:
  a client scanning module that when executed by the processor performs actions comprising the following, responsive at least in part to the indication of at least one of the plurality of blocks indicating that the application has not been found to be free of malware:
    displaying an alert to a user that the application has not been verified to be free of malware;
    receiving user input specifying whether to execute the code without performing a scan of the block for malware; and
    responsive at least in part to the user input, executing the code without performing a scan of the block for malware.

13. A computer adapted to incorporate malware scanning within an application streaming system, comprising:

a non-transitory computer-readable storage medium storing computer program modules executable by a computer processor, the modules comprising:

an application packaging module that when executed by the processor segments a pre-existing application into a set of blocks and stores the set of blocks separately within an application repository;

a block server module that when executed by the processor receives, from a remote client, requests for a plurality of blocks segmented from the application by the application packaging module, each block comprising code for a unit of the application; and a scan assurance module that when executed by the processor determines whether the application has been found to be free of malware;

wherein:

the block server module when executed by the processor identifies the requested blocks within the application repository;

the scan assurance module when executed by the processor inserts, as metadata into each of the identified blocks, an indication of a portion of the application that the block represents;

the scan assurance module when executed by the processor inserts, as metadata into each of a plurality of the identified blocks, an indication of whether the scan assurance module has determined the application to be free of malware, the indication of whether the application has been found to be free of malware requiring at most one byte placed at a known location in the block and including either a first code indicating that the application has been found to be free of malware or a second code indicating that the application has not been found to be free of malware, and the block server module when executed by the processor provides the blocks, including the inserted indications, to the remote client.

14. The computer of claim 13, the modules further comprising an application scanning module when executed by the processor determines whether applications are free of malware.

15. The computer of claim 13, the modules further comprising a server authentication module that when executed by the processor encrypts at least one of the blocks provided by the block server to the client.

16. The computer of claim 13, the modules further comprising a server authentication module that when executed by the processor digitally signs, with a digital signature, at least one of the blocks provided by the block server to the client.

17. The computer of claim 13, wherein:

the application packaging module when executed by the processor segments the application into a set of blocks and stores them in an application repository storing a plurality of applications;

the block server when executed by the processor obtains the blocks of the application from the application repository, each application packaged in the application repository as a set of blocks for delivery via application streaming.

18. The computer of claim 17, wherein each application stored in the application repository was determined to be free of malware prior to being stored in the application repository.

* * * * *